US009686479B2

(12) United States Patent
Marks et al.

(10) Patent No.: US 9,686,479 B2
(45) Date of Patent: Jun. 20, 2017

(54) METHOD FOR COMBINING MULTIPLE IMAGE FIELDS

(71) Applicant: Duke University, Durham, NC (US)

(72) Inventors: Daniel Marks, Durham, NC (US); David Jones Brady, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 15/022,439

(22) PCT Filed: Sep. 16, 2014

(86) PCT No.: PCT/US2014/055760
§ 371 (c)(1),
(2) Date: Mar. 16, 2016

(87) PCT Pub. No.: WO2015/039067
PCT Pub. Date: Mar. 19, 2015

(65) Prior Publication Data
US 2016/0286137 A1      Sep. 29, 2016

Related U.S. Application Data

(60) Provisional application No. 61/878,219, filed on Sep. 16, 2013.

(51) Int. Cl.
*H04N 5/265*     (2006.01)
*G06T 3/40*      (2006.01)
(Continued)

(52) U.S. Cl.
CPC .......... *H04N 5/265* (2013.01); *G06T 3/4038* (2013.01); *G06T 5/002* (2013.01); *H04N 5/23238* (2013.01); *H04N 5/247* (2013.01)

(58) Field of Classification Search
CPC .... H04N 5/265; H04N 5/23238; H04N 5/247; H04N 5/2628; G06T 3/4038; G06T 5/002
See application file for complete search history.

(56) References Cited

U.S. PATENT DOCUMENTS

2006/0291747 A1   12/2006   Peterson
2011/0316963 A1   12/2011   Li et al.
(Continued)

OTHER PUBLICATIONS

"International Search Report and Written Opinion", issued in International Application No. PCT/US2014/055760, dated Dec. 8, 2014.

*Primary Examiner* — Nicholas Giles
(74) *Attorney, Agent, or Firm* — Kaplan Breyer Schwarz, LLP

(57) ABSTRACT

Methods for stitching multiple sub-images together to form a substantially seamless composite image are disclosed. Overlap regions formed by each pair of neighboring sub-images are periodically examined and key features common to the overlap regions in each sub-image of the pair are identified. A transformation is determined for each sub-image pair based on the positions of these key features. The transformation is split between the sub-images and applied to distort the overlap regions in each sub-image pair such that they are substantially aligned. Applying the transformations to each overlap region in the overall image enables creation of a substantially seamless composite image. In some embodiments, the process wherein the transformations are determined is run as a feedback loop to enable continuing refinement of the transformations.

16 Claims, 5 Drawing Sheets

(51) Int. Cl.
*G06T 5/00* (2006.01)
*H04N 5/232* (2006.01)
*H04N 5/247* (2006.01)

(56) References Cited

U.S. PATENT DOCUMENTS

| | | | | |
|---|---|---|---|---|
| 2013/0002828 A1* | 1/2013 | Ding | ............ | G02B 17/0836 |
| | | | | 348/49 |
| 2015/0077523 A1* | 3/2015 | Sato | ............ | H04N 13/0225 |
| | | | | 348/49 |
| 2016/0051321 A1* | 2/2016 | Salahieh | ............ | A61B 1/00082 |
| | | | | 600/439 |

\* cited by examiner

METHOD FOR COMBINING MULTIPLE IMAGE FIELDS

STATEMENT REGARDING FEDERALLY SPONSORED RESEARCH

This invention was made with Government support under Grant Number HR0011-10-C-0073 awarded by the Defense Advanced Research Projects Agency (DARPA). The Government has certain rights in the invention.

FIELD OF THE INVENTION

The present invention relates to imaging in general, and, more particularly, to methods for forming a composite image from multiple image fields.

BACKGROUND OF THE INVENTION

A digital camera includes an optical system that forms an image of a scene onto an array of detectors (i.e., sensors), referred to as a focal-plane array (FPA). Modern digital cameras typically contain several million to tens of millions of sensors producing images having millions of image pixels.

As pixel counts continue to increase and begin to approach a billion, it becomes increasingly difficult to image a scene with a single camera and FPA. As a result, large-scale imaging systems have been developed that utilize multiple camera systems, each of which images a different portion of a scene onto its respective FPA, thereby creating a plurality of digital sub-images. These sub-images are then stitched together using image processing to form a single high-pixel-count image.

This presents challenges for the image processing, however, because the individual sub-images must be registered with each other and blended together to form a substantially seamless composite image. Merging the sub-images requires several operations, including identifying corresponding features between sub-images and transforming one or more of the sub-images to coordinate with the overall image.

Most prior-art image stitching methods assume that the points in different sub-images are related by straight-forward coordinate transformations (i.e., homographies) between the homogeneous coordinate systems of each camera. After corresponding features have been identified between two cameras, a homography is fit between these features. Once these homographies are fit, the images are transformed so as to appear from the desired viewpoint of the composite image.

A-priori knowledge of the positioning of each camera within the arrangement facilitates image processing; however, the arrangement of the cameras used to generate the sub-images is subject to perturbations due to environmental factors, such as temperature, shock, vibration, etc. As a result, the registration between cameras can change, leading to variations that can be significant relative to the desired image resolution.

In addition, the focus of each individual camera is typically controllable. This gives rise to a wide range of angular scale among the sub-images, which makes it more difficult to determine the registration between the cameras. Further, the typical model assumes a pinhole camera. As a result, the effective "pinhole" location, or principal point position, and image angular scale of each microcamera depends on the focus of each microcamera. The homographies are dependent on the microcamera foci, however, and must be readjusted as the foci change.

Parallax between the cameras can further complicate the registration between sub-images. As a result, extensive analysis is often required to determine the relative positions of the sub-images and/or to deghost double images that can result from parallax. Parallax between overlapping regions of adjacent sub-images makes it impossible, in general, to overlap all features in the overlapping regions since the features will have different range-dependent displacements in the different cameras.

Stitching of multiple sub-images into a composite image, therefore, normally takes several tens of minutes to hours because the steps of finding features, corresponding them between images, and transforming and blending tens or hundreds of sub-images is a time consuming process. While such long times for imaging stitching can be tolerated in some applications, it is unacceptable in many other applications. In high-pixel-count video imagery, for example, tens or hundreds of sensor arrays simultaneously acquire image data at video rates of one to sixty frames per second or more. As a result, conventional image-stitching approaches are unsuitable.

A method for rapidly combining a plurality of sub-images into a single, composite image remains unrealized in the prior art.

SUMMARY OF THE INVENTION

The present invention enables the formation of an image of a scene by combining multiple sub-images of different regions of the scene into a single, seamless composite image without some of the disadvantages of the prior art. Embodiments of the present invention are particularly well suited for forming gigapixel images from multiple megapixel sub-images at rates suitable for video imagery.

The present invention provides a sub-image stitching process that takes advantage of the high degree of coherence between successive frames of a video stream. This high coherence manifests as geometric relations within the frames that remain substantially unchanged from frame to frame. Embodiments of the present invention exploit the high coherence by embedding the stitching process in a feedback loop in which common features between constituent sub-images are identified in successive frames, thereby enabling geometric relations between the sub-images to be continuously adjusted to maintain registration of the common features and, therefore, the constituent sub-images.

In embodiments of the present invention, overlapping sub-images, each of a different region of the scene, are stitched together such that, for each pair of overlapped sub-images, the overlapping portion within each sub-image is distorted align it with the corresponding overlapping portion of the other sub-image. The amount of required distortion is determined by finding a transformation, such as an affine transformation that can be applied equally to both overlapping portions. Complimentary transformations are then applied to the overlapping portions in accordance with a masking function that reduces the effect of each transformation away from its corresponding overlapping portion. As a result, multiple overlap regions within a sub-image can be independently transformed without significantly affecting the transformations in the other overlap regions within the sub-image. In some embodiments, the overlap regions are periodically examined as part of a feedback loop that continuously refines the transformation applied to each overlap region to improve the quality of the composite image.

An illustrative embodiment is a method that includes operations that comprise acquiring image data for the scene at each of a plurality of microcameras. Each microcamera provides image data for a different portion of the scene, thereby providing a different sub-image of the scene. The microcameras are arranged such that each sub-image overlaps with at least one other sub-image to collectively define at least one overlap region. The method continues with, for each overlap region in each sub-image, determining an affine transformation suitable for combining key points in the overlap region with the corresponding overlap region of the overlapping sub-image. The affine transformation is then split and applied to each of the pair of sub-images so that the image points in the overlapping portions of each sub-image are distorted by the same amount but in opposite directions. The distortion for each overlap region is applied based on a masking function that gradually reduces the effect of the transformation on image pixels as a function of distance from that overlap region. As a result, multiple overlap regions within the same sub-image can be substantially independently distorted to seamlessly stitch the sub-image with multiple neighboring sub-images. An image of the scene is then rendered based on the overlap-deformed sub-images. In some embodiments, the transformation used to define the distortion of each overlap region in each sub-image is refined by re-acquiring new image data and rerunning the method as a feedback loop.

In some embodiments, the amount of distortion is scaled by a scaling factor to enable a stable feedback loop used to refine the affine transformation.

In some embodiments, the transformations used to define the distortion applied to the overlap regions are a coordinate transformation that may be defined by one or more of the following transformations composited together: translations, rotations, expansions, dilations, shear transformations, homographic transformations, barycentric transformations, and the like.

An embodiment of the present invention is a method for forming an image of a scene, the method comprising: acquiring a first plurality of sub-images containing image pixels, wherein each sub-image of the first plurality thereof is based on a different portion of the scene, and wherein the first plurality of sub-images includes a first sub-image and a second sub-image that overlap in a first overlap region; defining a first transformation based on a first correspondence of a first plurality of key features in the first overlap region, the first plurality of key features being in each of the first sub-image and second sub-image; determining a first distortion for improving the first correspondence; multiplying the second distortion by a second masking function to form a second masked distortion, the second masking function having a third magnitude at a third point within the second overlap region that is greater than a fourth magnitude at a fourth point that is outside of the second overlap region and within the first sub-image; and applying the second masked distortion to each of the first sub-image and third sub-image, where the second masked distortion is applied to the first sub-image and the third sub-image in equal and opposite fashion.

DETAILED DESCRIPTION

Figure 1:
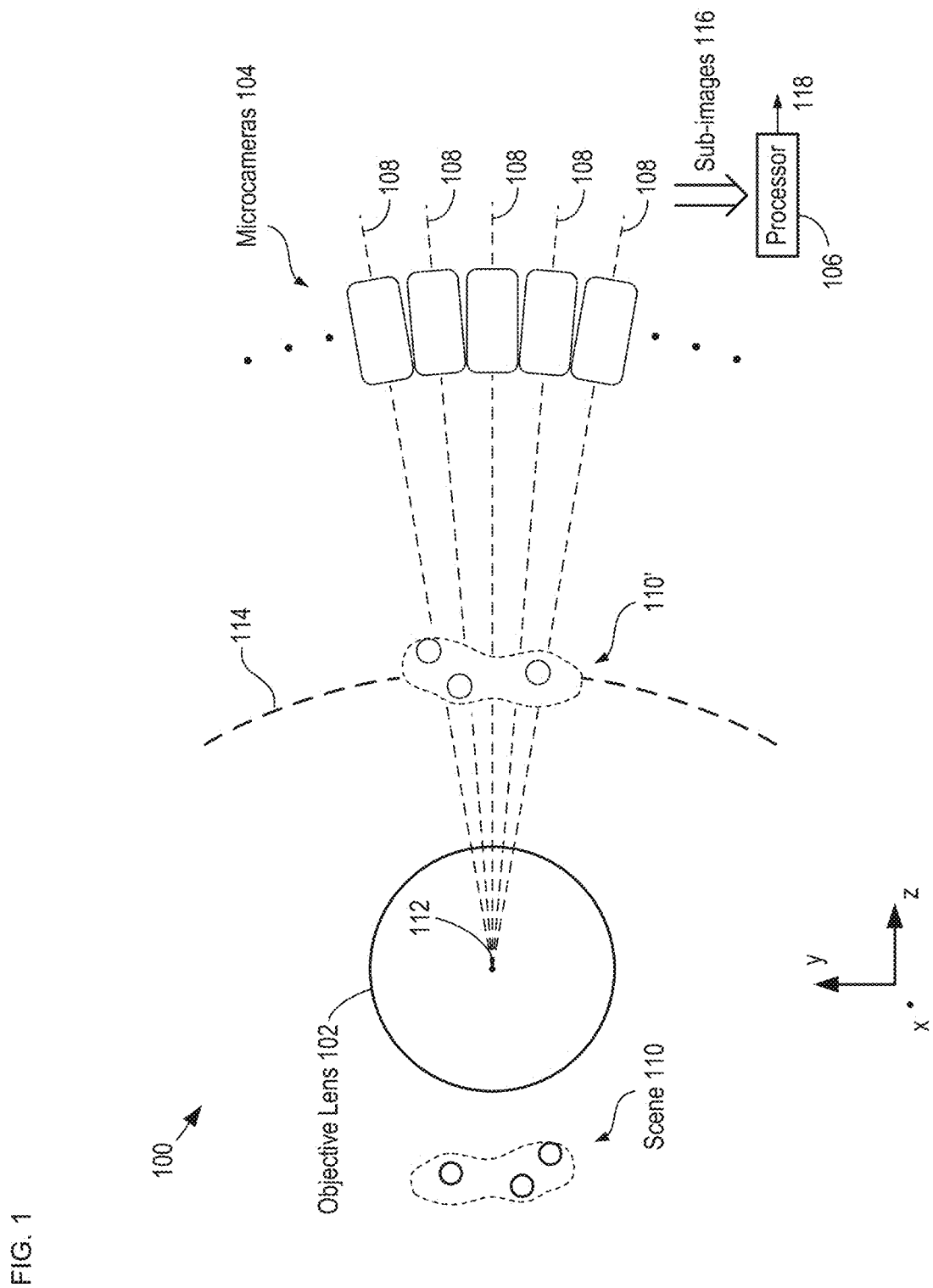
FIG. 1 depicts a schematic drawing of an imaging system in accordance with an illustrative embodiment of the present invention.

FIG. 1 depicts a schematic drawing of an imaging system in accordance with an illustrative embodiment of the present invention. System 100 is a monocentric-lens-based multiscale imaging system that comprises objective lens 102, microcameras 104, and processor 106.

One skilled in the art will further recognize, after reading this Specification, that the present invention is suitable for use with any optical system employing multiple cameras and/or FPAs, such as multiscale imaging systems having objective lenses that are not monocentric, non-multiscale imaging systems that include arrangements of individual cameras, arrangements of individual telescopes, etc. Examples of multiscale imaging systems suitable for use with the present invention are described in detail in U.S. Patent Publication Nos. 20130242060, 20140192254, and 20140176710, as well as U.S. Pat. No. 8,259,212, each of which is incorporated herein by reference.

System 100 is analogous to multiscale imaging systems described in U.S. Pat. No. 8,259,212, issued Sep. 4, 2012, as well as AWARE Wide-Field gigapixel cameras disclosed by Brady, et al., in "Multiscale gigapixel photography," *Nature*, Vol. 486, pp. 386-389 (2012), each of which is incorporated herein by reference.

Objective lens 102 is a monocentric lens, wherein all of the optical surfaces of the lens have a center of curvature located at center point 112. A monocentric lens identically focuses light coming from any direction, which enables it to view a wide area. Objective lens 102 forms intermediate image 110' of scene 110 at image field 114.

Each of microcameras 104 includes camera optics and a focal plane array comprising a two-dimensional arrangement of 10 million charge-coupled device (CCD) elements. In some embodiments of the present invention, at least one of microcameras 104 employs an FPA comprising a different arrangement of another photosensitive device, such as a CMOS sensor, photodetector, avalanche photodiode, and the like.

Microcameras 104 are arranged in a substantially spherical arrangement about objective lens 102 such that each microcamera has a unique optical axis 108 and all optical axes intersect at center point 112. In the illustrative embodiment, the number of microcameras 104, N, included in system 100 is 820; however, it will be clear to one skilled in the art, after reading this Specification, that imaging systems in accordance with the present invention can include any practical number of microcameras. Microcameras 104 are registered such that they relay overlapping images of different portions of image field 114 onto their respective FPAs to create a plurality of sub-images of the image field—each sub-image having 14 million image pixels. Typically, system 100 collectively produces an image of scene 110, where the image includes approximately 8.2 gigapixels, or about 10 unique megapixels per microcamera on average, as described by DL Marks, et al., in "Engineering a gigapixel monocentric multiscale camera" Opt. Engr. 51, 083202 (2012), which is incorporated herein by reference. As discussed in detail below, portions of the image are shared and, therefore, redundant between microcameras. These overlap regions are used to determine the transformations between microcamera fields. As a result, the number of pixels in the final realized image is less than the aggregate number of pixels of microcameras 104. Furthermore the aspect ratio of commercial FPAs are often wider than needed, so that the periphery of the sensor may not provide useful image information. Factoring the redundancy and aspect ratio into account, Each of microcameras 104 provides an electrical signal representative of its respective sub-image 116 to processor 106, which processes the electrical signals to stitch the sub-images together to form composite image 118.

Sub-images 116 can be analyzed in a manner similar to an array of discrete cameras or telescopes. Each microcamera 104 is equivalent to a telescope where the equivalent size of the telescope is the microcamera physical dimensions imaged through the objective into the object space. Using a single objective (i.e., objective 102) that is shared among the microcamera array enables system 100 to fit in a much smaller space than an equivalent array of telescopes, however. Once the effective magnification of the objective is accounted for, therefore, each microcamera 104 can be described by the same parameters as any optical system, including:

i. nominal instantaneous field-of-view (IFOV), or the nominal number of radians/pixel;
ii. number of pixels, horizontally and vertically on the sensor of the camera;
iii. distortion parameters of the lens of the cameras, usually described as a polynomial mapping the angle tangent of the physical ray to the idealized angle tangent of an undistorted camera;
iv. position and size of the entrance pupil relative to the optical system axis;
v. a nominal rotation that describes the transformation from the local microcamera optical axis and the global coordinates of the entire camera array. Typical specifications of this are axis/angle, pitch/yaw/roll, and Euler angles; and
vi. a nominal translation that describes the displacement of the microcamera optical axis and the global coordinates of the entire camera array. This is typically chosen so that all of the optical axes intersect at a common point.

Parallax manifests in system 100 as "entrance pupil walk" due to the fact that the stops and entrance pupils of microcameras 104 "rotate" about central point 112. This gives rise to a slight displacement between the entrance pupils of adjacent microcameras. As a result, even with perfect knowledge of the true set of rotations and translations for microcameras 104, the presence of parallax makes it difficult, if not impossible, to eliminate stitching error between sub-images 116 using conventional stitching approaches.

It is an aspect of the present invention that, by periodically examining features shared between adjacent sub-images, a distortion can be applied to each sub-image to improve the overlap of these features, thereby forming a substantially seamless composite image.

It should be noted that methods in accordance with the present invention differ significantly from stitching methods used in panoramic imaging, in which still images taken by single camera are stitched together. The image processing in panoramic imaging demands a significant portion of the time between acquisition and presentation. Since the image is a still image, there is time to carry out numerous computational steps, such as identifying feature points on subsequent images, determining corresponding key points, estimating projections that map between the points, bundle adjustment, re-projection of the image, and deghosting. The computational effort required to perform these steps at video rates on gigapixels of data would be substantial, however, and is impractical.

The present invention exploits the fact that microcameras 104 have substantially fixed positions in system 100. As a result, the projection viewpoints of the microcameras are likely to vary only due to focus variations and other small motions. By assuming fixed projection parameters for the microcameras and using small distortions to overlap the sub-images 116, the overlapping process may be simplified from the global optimization that is typically used during a bundle adjustment to a local optimization that distorts images locally to best overlap neighboring images. The distortions compensate for the small changes in image scale, rotation, and translation that may occur, and also help to minimize parallax errors by determining an aesthetically acceptable place for a seam.

Generalized Sub-Image Stitching Approach

The present invention is based on the recognition that satisfactory sub-image stitching can be achieved by a local registration process between adjacent microcamera sub-images only. This is enabled by the fact that the positions of the overlap regions between adjacent sub-images are known in advance and are not expected to change significantly as compared to the scale of a microcamera image field. In addition, in the case of video panorama stitching, once the registration is found for one frame of a video stream, successive frames of the video stream usually may be stitched using substantially identical registrations between the frames. As a result, in some embodiments of the present invention, registration is performed incrementally and sequentially to successive frames of a video stream rather than independently. The combination of local registration of microcamera sub-images and successive registration of composite image frames is achieved, therefore, by a periodic correction to the registration. This correction process examines the amount of stitching error in overlap regions that develops when newly acquired microcamera images are combined in a composite image with the current registration estimates. Stitching error is determined by examining common feature points between the overlap regions and estimating a transform between these feature points, which is then used to update the registration estimates. Typically, as the overlap improves, more common feature points are identified, thereby enabling improved stitching-error and registration estimates. In some embodiments, this correction process is applied as a part of a feedback or control loop, where the errors in the registration are determined and then reduced each iteration through adjustment of the geometric parameters defining the registration. Once such a feedback loop "locks" into a stable registration of the cameras, small changes of the registration may be tracked to minimize the registration disparity as the video sequence progresses.

Figure 2:
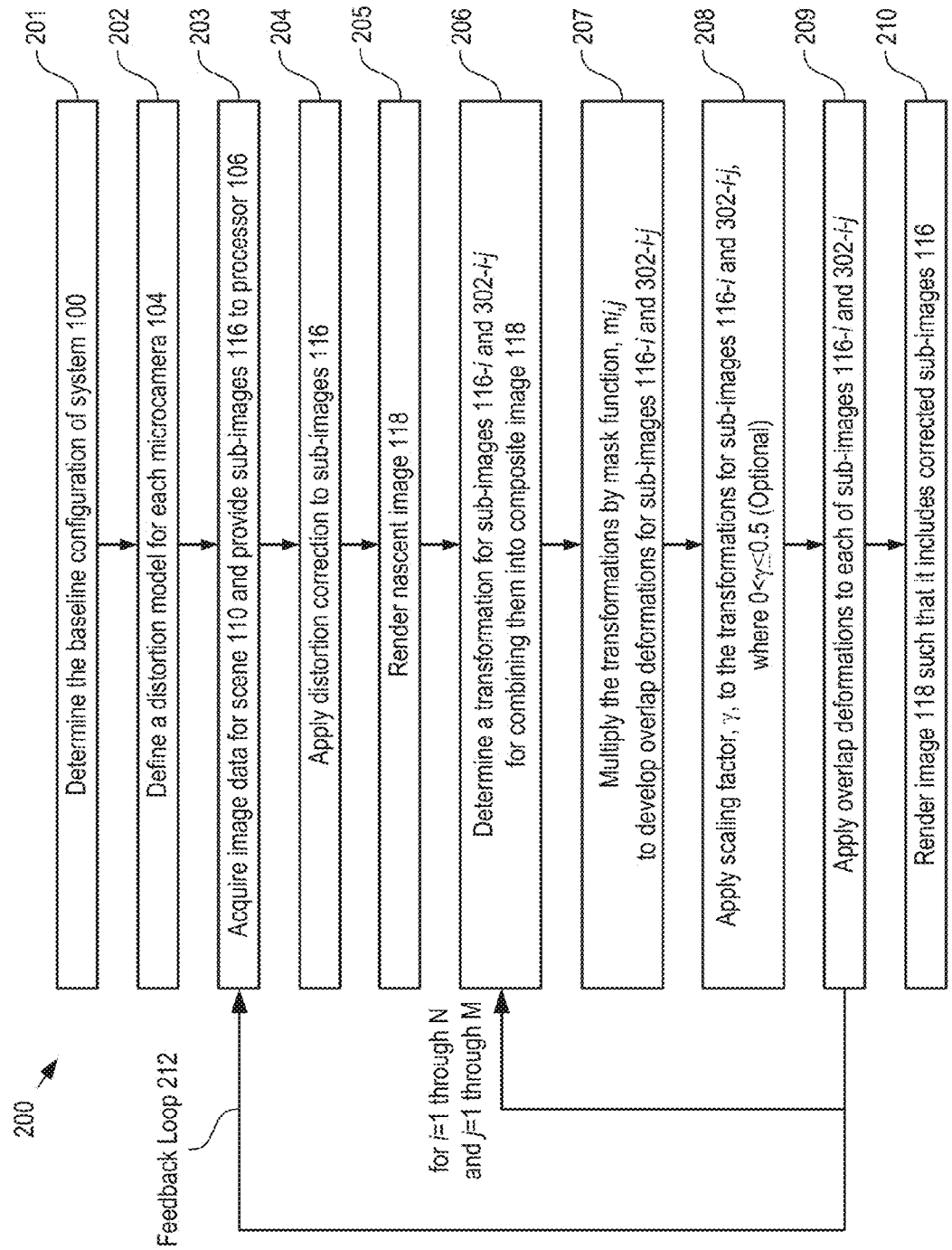
FIG. 2 depicts operations of a method suitable for forming a composite image in accordance with the illustrative embodiment of the present invention.

FIG. 2 depicts operations of a method suitable for forming a composite image in accordance with the illustrative embodiment of the present invention. Method 200 begins with operation 201, wherein the baseline configuration of system 100 is determined.

The baseline configuration of system 100 is a physical description of the positions of microcameras 104, their orientations with respect to objective lens 102, the nominal focus of each microcamera, and the like. Typically, the baseline configuration of an imaging system is defined by its design. It should be noted that, typically, microcameras are arranged such that the image field of every microcamera partially overlaps the image field of at least one other microcamera. The amount of overlap is a matter of design choice and is normally a region with a length along the lines joining the microcameras of approximately 5% to 20% of the width of the image on each of the microcamera fields. More overlap between microcameras improves the ability to obtain satisfactory registration between sub-images, but at the cost a reduced number of unique pixels recorded by the imaging system.

At operation 202, system 100 is calibrated to determine parameters for correcting the distortion at each microcamera 104. This enables distortion correction of the image field provided by each microcamera during image processing. It will be clear to one skilled in the art how to calibrate system 100.

In an exemplary calibration operation, a camera model is defined based on a pinhole camera model that, in general, has lens distortion. Each pixel is defined by a local slope, or angle tangent, x' and y' relative to the horizontal and vertical axis of the respective microcamera. As a result, for a microcamera 104 having focal length, f, the image position is −x'f and −y'f. Distortion can then be characterized by a polynomial in the image radius that transforms one image radius to another as to obtain a new set of corrected angle tangents x" and y":

$$x''=x'(1+K_1 r'+K_2 r'^2+K_3 r'^3) \text{ and}$$

$$y''=y'(1+K_1 r'+K_2 r'^2+K_3 r'^3) \text{ and}$$

$$r'=\sqrt{x'^2+y'^2} \quad (1)$$

with the constants $K_1$, $K_2$, $K_3$ known to a sufficient accuracy as to not limit the reconstruction quality. Using such a distortion correction model, lens distortion can be characterized and removed.

At operation 203, microcameras 104 provide sub-images 116 to processor 106.

At operation 204, processor 106 applies the distortion correction model defined for each microcamera 104 to its respective sub-image 116.

At operation 205, nascent image 118 is rendered by processor 106. Nascent image 118 includes the raw sub-images 116 (i.e., sub-images to which overlap transformations have not been applied). In some embodiments, the raw sub-images have had distortion correction applied. In some embodiments, raw sub-images have had overlap transformation applied in previous cycles, but have not been updated with new sub-image data provided in operation 203 (i.e., when method 200 is being used to update a previously determined overlap distortion with new image data).

Figure 3:
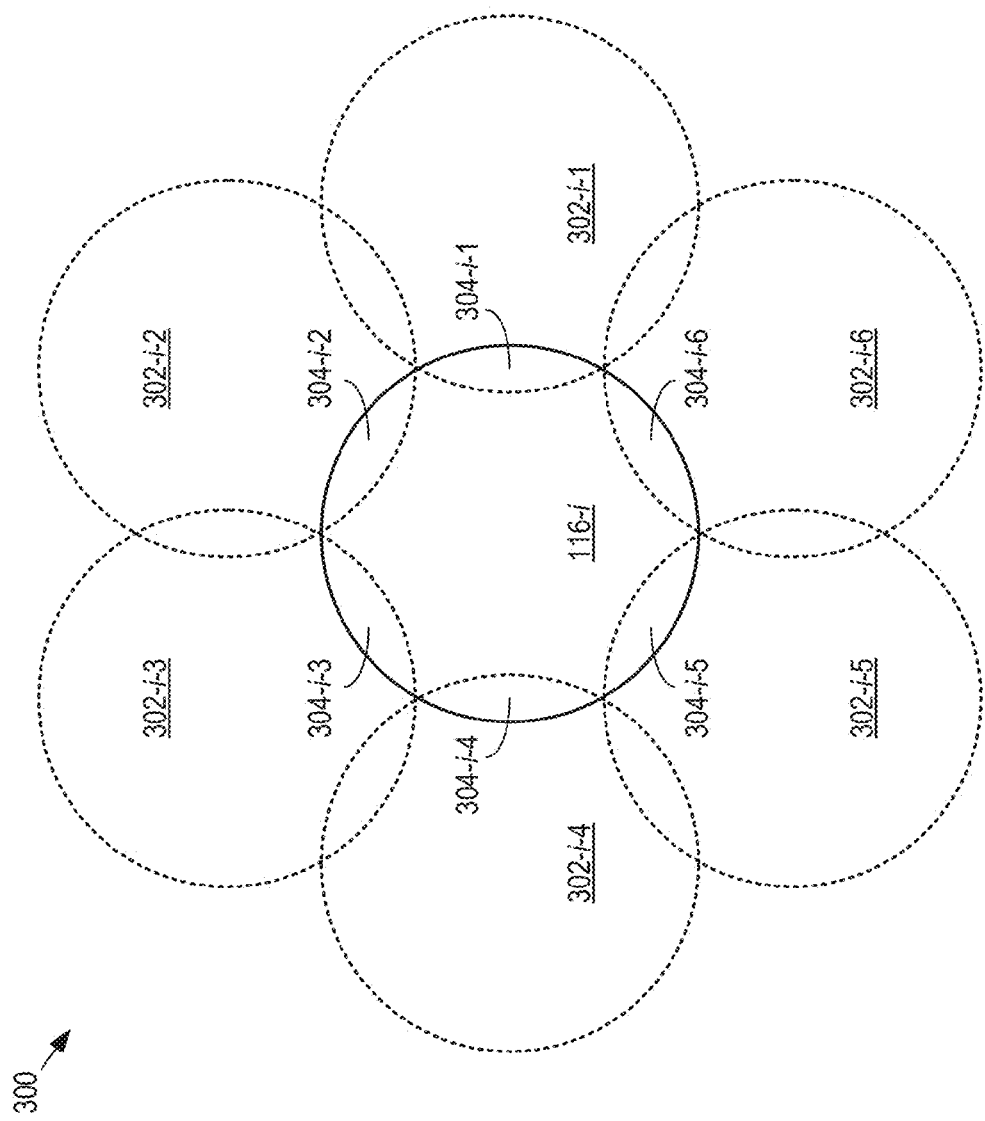
FIG. 3 depicts a portion of nascent image 118.

FIG. 3 depicts a portion of nascent image 118. Portion 300 includes raw sub-images 116-i and 302-i-1 through 302-i-M, where M is the number of microcameras whose image fields overlap that of microcamera 104-i. Sub-image 116-i is the image field provided by exemplary microcamera 104-i, which is located in the interior of the arrangement of microcameras. Sub-images 302-i-1 through 302-i-6 are sub-images 116 provided by the microcameras that surround microcamera 104-i. One skilled in the art will recognize that the arrangement of the sub-images is dependent upon the overall arrangement of microcameras 104, as well as the position of the microcamera 104-i within the arrangement. For example, since microcamera 104-i is located in the interior of the arrangement of microcameras 104, its sub-image has six overlapping sub-images from the neighboring microcameras (i.e., M=6). If the selected microcamera were located at the edge of the arrangement, however, it might be neighbored by only one, two, or four other microcameras. Further, in some microcamera arrangements an interior camera might be neighbored by more or less than six other microcameras. For example, in an icosahedral geodesic arrangement, the image field of microcamera 104-i would be overlapped by the image fields of five neighboring microcameras.

Sub-images 302-i-1 through 302-i-6 overlap with sub-image 116-i to form double overlap regions 304-i-1 through 304-i-6, respectively, which are midway between the fields of each pair of overlapping microcameras. It should be noted that in some embodiments, the sub-images also form triple overlap regions where the sub-images from three microcameras overlap. For the purposes of the present discussion, these triple overlap regions are neglected; however, operations analogous to those of method 200 can be applied to these regions as well without departing from the scope of the present invention.

At operation 206, a transformation based on overlap region 304-i-j is determined for each of sub-images 116-i, for each of i=1 through N and each j=1 through M, to improve the stitching of the sub-images into composite image 118. It should be noted that it is an aspect of the present invention that the transformation applied to each sub-image is based only on the overlap region between the sub-images since only this region provides useful information as to the correspondence between the sub-images.

Figure 4:
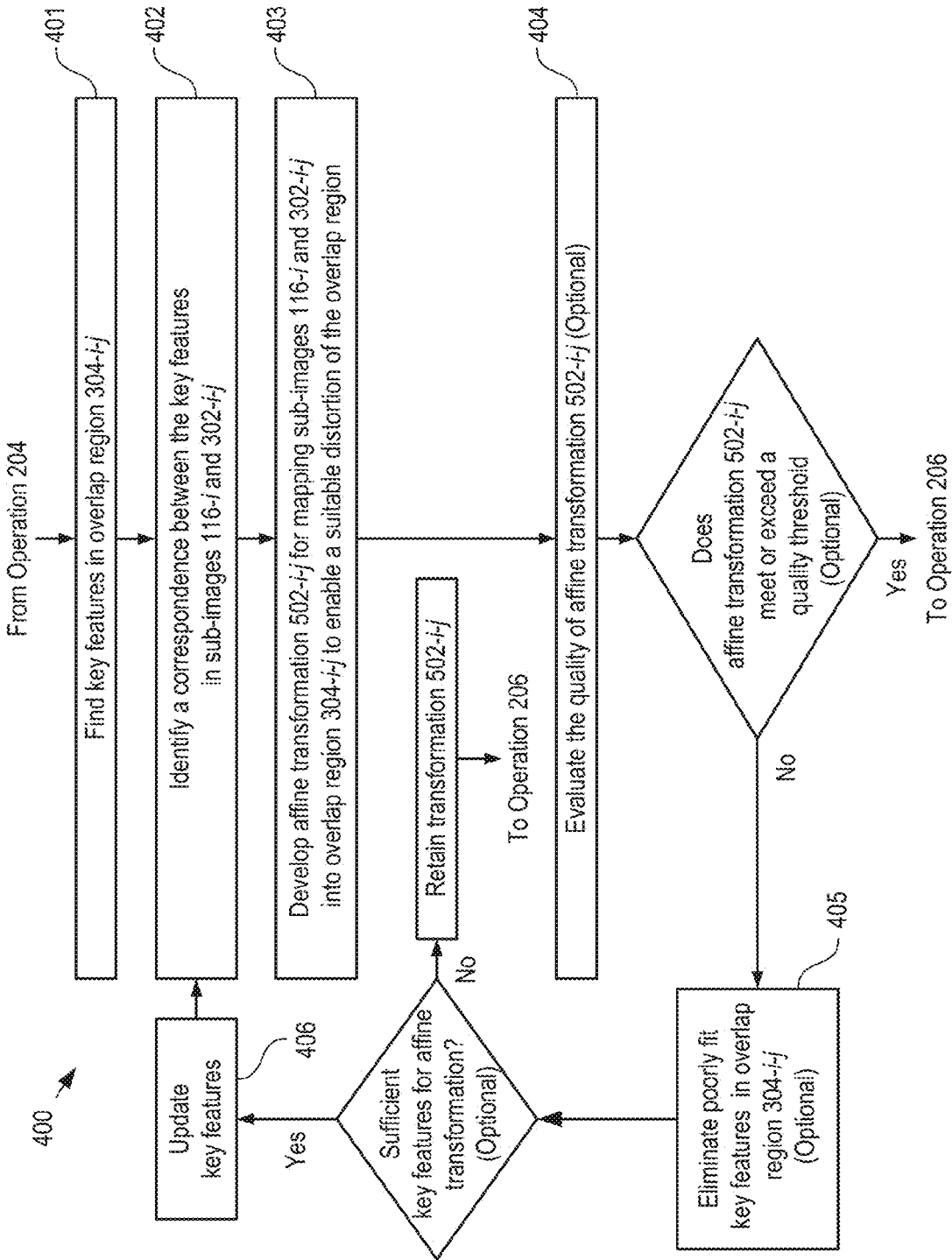
FIG. 4 depicts sub-operations suitable for determining a transformation for a sub-image in accordance with the illustrative embodiment of the present invention.

FIG. 4 depicts sub-operations suitable for determining a transformation for a sub-image in accordance with the illustrative embodiment of the present invention. Sub-method 400 is suitable for use in operation 205 and begins with sub-operation 401, wherein a plurality of key features is identified in overlap region 304-i-j. Key features can be identified using any of several conventional feature-detection methods, such as Speeded Up Robust Features (SURF) detection, Scale Invariant Feature Transform (SIFT) detection, Oriented FAST and Rotated BRIEF detection (ORB) detection, gradient location and orientation detection, blob detection, and the like.

Figure 5:
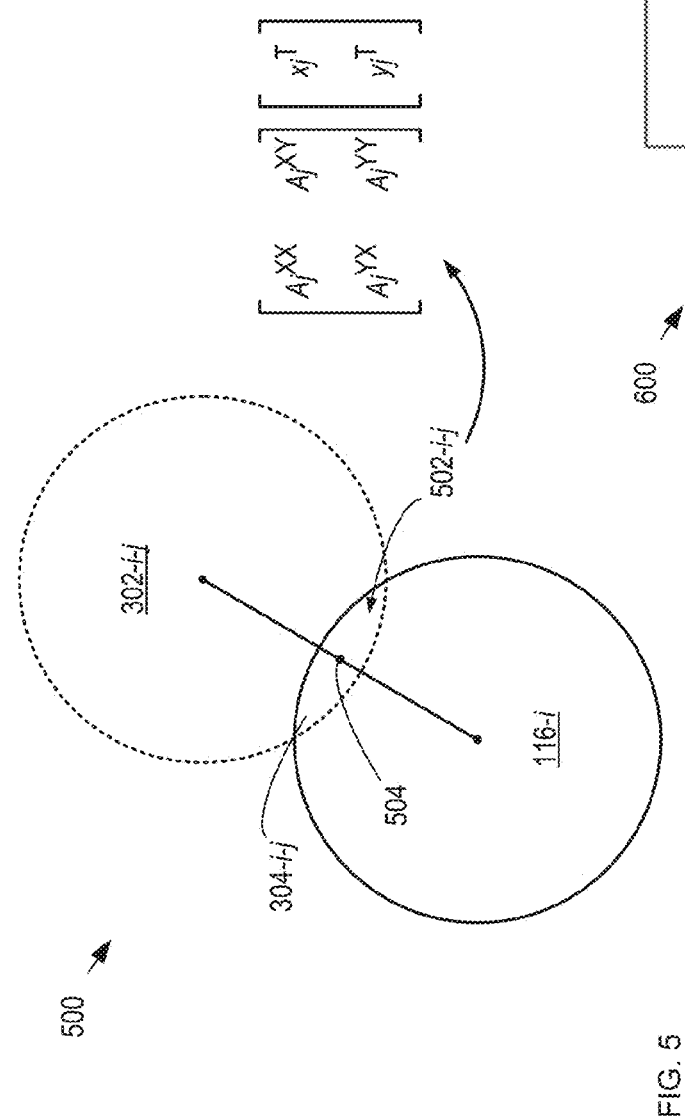
FIG. 5 depicts the coordinate system for defining an affine transformation between a pair of overlapping sub-images.

FIG. 5 depicts the coordinate system for defining an affine transformation between a pair of overlapping sub-images. Diagram 500 depicts the coordinate system between sub-image 116-i a neighboring sub-image 302-i-j, which overlap in overlap region 304-i-j.

At sub-operation 402, a correspondence between the key features of sub-images 116-i and 302-i-j in overlap region 304-i-j is identified.

At sub-operation 403, an affine transformation is developed to map both of sub-images 116-i and 302-i-j to the key features identified in sub-operation 401 so as to enable distortion of overlap region 304-i-j. Affine transformation 502-i-j is defined by several parameters, including a center point of rotation, a rotation matrix, and a translation matrix.

Point 504 is the center of overlap region 304-i-j, which defines the center point of rotation for the affine transformation. Point 504 has coordinates $x_j^C$ and $y_j^C$, which are defined as the change in the x- and y-directions relative to the center point of sub-image 116-i within the local coordinates of the sub-image.

The rotation matrix of affine transformation 502-*i-j* is defined as a 2×2 matrix having elements $A_j^{XX}$, $A_j^{YX}$, $A_j^{XY}$, and $A_j^{YY}$ as:

$$\begin{bmatrix} A_j^{XX} & A_j^{XY} \\ A_j^{YX} & A_j^{YY} \end{bmatrix} = \begin{bmatrix} s\cos\theta & -s\sin\theta \\ s\sin\theta & s\cos\theta \end{bmatrix} \quad (2)$$

where s is a scaling factor, and θ is the rotation angle necessary to overlap the sub-images.

The rotation matrix scales and rotates overlap region 304-*i-j* around point 504.

The translation matrix of affine transformation 502 is a 1×2 matrix having elements $(x_j^T, x_j^T)$. The translation matrix is applied to translate overlap region 304-*i-j*.

It should be noted that, typically, the corresponding matrix for the overlap region 304-*i-j* for neighboring sub-image 302-*i-j* has a scaling of 1/s and a rotation of –θ. As a result, sub-image 302-*i-j* is translated and rotated in an equal and opposite fashion from sub-image 116-*i*, which divides the resultant distortion equally between the two neighboring sub-images, rather than forcing one to distort to conform to the other.

Each of the microcameras associated with overlap region 304-*i-j* have separate (but generally related) sets of these parameters. The coordinate transformation from the lens-distortion corrected coordinates (x",y") to the affine-transform distorted map is given by (x''',y''') as:

$x''' = x'' + \sum_{j=1}^{M} m_j(x'',y'')[x_j^T + (x''-x_j^C)(A_j^{XX}-1) + (y''-y_j^C) A_j^{YX}]$ and $y''' = y'' + \sum_{j=1}^{M} m_j(x'',y'')[y_j^T + (x''-x_j^C)(A_j^{XY}) + (y''-y_j^C)(A_j^{YY}-1)].$ (3)

It should be noted that, if the rotation and translation parameters of a microcamera were changed so that a particular overlap region was registered well, the registration of other overlap regions shared by the same microcamera are likely to be degraded. Because of the parallax error, using other degrees of freedom may be better to optimize registration for all overlap regions simultaneously, especially when the actual rotations and translations are already close to their nominal positions.

In contrast, in some embodiments of the present invention, local affine transformations are defined for the areas of each of the two sub-images that form a particular overlap region, where the local affine transformations distort that overlap region to better mutually overlap. For example, a microcamera with six neighbors would have six affine transformations for each of its double overlap regions that are used to deform the overlap areas to better conform to its neighboring images. Since all of these affine transformations cannot be applied simultaneously to the entire microcamera image, they are blended together using a weighted masking function.

At optional sub-operation 404, the quality of affine transformation 502-*i-j* is evaluated by applying it to each of sub-images 116-*i* and 302-*i-j* and determining the separation of the identified key features in each sub-image (i.e., determining the amount of error in the transformed sub-images).

At optional sub-operation 405, outlying poorly fit key features are eliminated based on a method such as Random Sampling Consensus (RANSAC) or a different user-defined threshold. For example, outlying key features might be defined as the worst fit 20% of the key features or key features whose fits are greater than one standard deviation above the mean fit, etc.

Typically, once the poorly fitting key features are eliminated, the remaining key features are evaluated to determine whether there is a sufficient number for developing an affine transformation. If not, then the previous transformation 502-*i-j* is retained and the method proceeds to operation 206.

If, on the other hand, the evaluation determines there are enough key features to develop an affine transformation, at sub-operation 406, the key feature set is updated. Sub-operations 403 and 404 are then performed again such that the correspondence between the key features in sub-images 116-*i* and 302-*i-j* is revised using the updated key feature set to develop a refined affine transformation 502-*i-j*.

In some embodiments, sub-method 400 is repeated using the transformed sub-images to refine the affine transformation until the fit reaches a user-defined termination point. Exemplary termination points include: a quality of the fit that meets or exceeds a user-defined threshold (e.g., a maximum number of pixels of error between the key points, etc.), the amount of improvement between iterations fails to improve the fit more than a user-defined amount, the number of key features found does not change significantly, and the like.

It should be noted that sub-method 400 represents only one method suitable for determining a transformation for sub-images 116. Other methods suitable for use with the present invention include, without limitation, methods that do not require determining feature points and directly compare the pixel data of the overlap regions including cross-correlations between images to find relative translations, scalings, and rotations, both in the untransformed spatial domain and in the Mellin-transformed (log-polar) spatial domain.

Returning now to method 200, at operation 207, the transformation determined in operation 206 is multiplied by a mask function such that each transformation primarily affects its associated overlap region while having a reduced influence in other overlap regions of the same sub-image. Because seams caused by abrupt boundaries between the overlap regions would be distracting, the masked-blending process weights each affine transformation to have the strongest influence in its respective overlap region while it gradually tapers to zero in other overlap regions.

Figure 6:
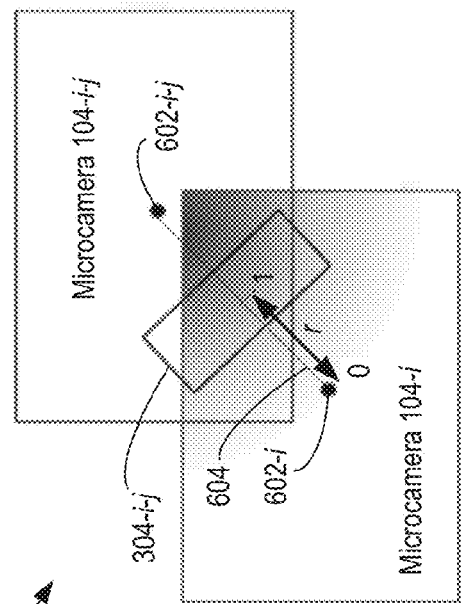
FIG. 6 depicts a density plot of a mask function in accordance with the illustrative embodiment of the present invention.

FIG. 6 depicts a density plot of a mask function in accordance with the illustrative embodiment of the present invention. Plot 600 shows a gray level plot of a mask function, $m_j(x'',y'')$, as applied to affine transformation 502-*i-j* within sub-image 116-*i*. The gray level in plot 600 denotes the mask function value.

Mask function $m_j(x'',y'')$ is used to blend the local transformations of each of overlap regions 302-*i*-1 through 302-*i*-M into a single continuous distortion of image field 116-*i*. Its magnitude increases with distance from center point 602-*i* (i.e., the center of microcamera 104-*i*) so that at the center point, the distortions associated with the transformations for each overlap region do not produce inconsistent distortion at center point 602. Mask function $m_j(x'',y'')$ is a maximum along axis 604, which joins center points 602-*i* and 602-*i-j* and decreases away from axis 604 to blend together the discontinuities from one microcamera to the next. Preferably, mask function $m_j(x'',y'')$ is be zero at the center of microcamera 104-*i* and increases out to the edges of the microcamera FOV. Since all of the microcamera fields cannot be consistently applied near the center of the field, the radial dependence of the mask function ensures that each affine transformation applies chiefly to its overlap region at the edge of the field and not near its center point, and that the transition to the region where the transformation applies is not overly abrupt.

Mask function $m_j(x'',y'')$ can be expressed as a function of angular dependence, $g(x)$, and radial dependence, $f(r)$, as:

$$m_j(x'', y'') = f\left(\frac{2\sqrt{x''^2 + y''^2}}{FOV}\right) \frac{g(\cos\phi_j)}{\sum_{j=1}^{N} g(\cos\phi_j)}, \quad (4)$$

$$\text{where } \cos\phi_j = \frac{x''x_j^C + y''y_j^C}{\sqrt{x''^2 + y''^2}\sqrt{(x_j^C)^2 + (y_j^C)^2}}.$$

Angle $\phi_j$ is the angle between a particular microcamera pixel coordinate and axis 604. Examples of the angular dependence function $g(x)$ that fit the criteria above to achieve a good transition are $g(x)=u^2 u(x)$ and $g(x)=(2x-1)u(2x-1)$, where $u(x)=0$ for $x<0$ and $u(x)=1$ for $x\geq 1$ (i.e., the step function). In general, if there are six overlap regions, they are approximately 60° apart, so that the angular dependence function should be low or near zero at this angle (i.e., $g(\cos 60°)$ is small).

For a first example, $g(\cos 60°)=(\cos 60°)^2 u(\cos 60°)=\frac{1}{4}$ and decreases to zero at 90°. For a second example, $g(\cos 60°)=(2\cos 60°-1)u(2\cos 60°-1)=0$. Both of these angular dependence functions work adequately, but behave differently as each decreases to zero at a different angle. If the angular dependence function is wider, then overlap regions influence each other more and therefore the algorithm may not converge as easily; however, the transitions between overlap regions are less abrupt. In contrast, it is easier to find the affine transformation for a particular overlap region when the angular dependence function is narrower because changes to one affine transformation influence another overlap region less; however, the transitions are more abrupt. In general, the convergence is preferably sufficiently fast so that the wider angular dependence function can be used in most cases. For overlap regions that have no neighbors at the edge of the microcamera array, however, a narrower angular dependence function is preferable, since these regions have fewer neighboring regions that can be affected by it and, therefore, in turn affect its own transformation.

In similar fashion, the radial-dependence function, $f(r)$, for $0 \leq r \leq 1$, is zero at center point 602-i (i.e., r=0) and increases monotonically to one at the edge of the microcamera field (i.e., r=1). This gives rise to a modified transformation that affects the periphery of the sub-image but not its center. The radial-dependence function should be relatively smooth and constant near center point 602-i and at the periphery of the field, but the transition between these two should not be overly abrupt. Radial-dependence functions suitable for use with the present invention include, for example, $f(r)=(1+2^n)r^n/(1+2^n r^n)$ where n is an exponent. If n is overly large, this function gives rise to an abrupt transition between overlap region 304-i-j and the region of sub-image 116-i near center point 602-i. If n is too small, all of the overlap regions affect the center region of sub-image 116-i and a discontinuity occurs there. Although the value of n is a matter of design choice, n=2 is an exemplary value that represents the smallest exponent for which $f(r)$ is differentiable at the origin when considering the $f(r)$ as a radially symmetric two-dimensional function, so that the mask function does not introduce a singularity into the mapping between $(x'',y'')$ and $(x''',y''')$. One skilled in the art will recognize, after reading this Specification, that other angular and radial functions exist that are suitable for use with the present invention; however, the examples provided here illustrate the basic compromises required to blend the overlap regions.

At optional operation 208, a scaling factor, $\gamma$, is applied to the transformation determined in operation 206. The scaling factor is typically within the range of zero to 0.5 and, preferably, less than 0.5. The scaling factor, $\gamma$, is applied to each of the scaling s, rotation $\theta$, and translation $(t_x,t_y)$ so these parameters are divided between the transformations applied to the image pixels within the overlap regions of each of sub-images 116-i and 302-i-j. As a result:

$$s_i = s^\gamma, \theta_i = \theta\gamma, t_{x,i} = t_x\gamma, t_{y,i} = t_y\gamma \text{ and}$$

$$s_j = s^{-\gamma}, \theta_j = -\theta\gamma, t_{x,j} = t_x\gamma, t_{y,j} = t_y\gamma. \quad (5)$$

Given the differential scalings, rotations, and translations of the two overlap regions within sub-images 116-i and 302-i-j, these can be applied in an adaptive manner to an existing transformation to update it based on a new set of image data provided in operation 203. Operations 203 through 208 collectively define feedback loop 212, which can be used to fine tune the overlap deformations used to smoothly stitch sub-images 116 into composite image 118. It should be noted that the scaling factor, $\gamma$, applied to the transformation determined in operation 206 acts as a damping factor that stabilizes feedback loop 212.

The choice of the value of scaling factor, $\gamma$, is a matter of design choice and is typically based on the desired stability and convergence speed for feedback loop 212. For example, given a perfect estimation of the transformation for sub-images 116, a choice of $\gamma=0.5$ would result in perfect overlap of the overlap regions in both of sub-images 116-i and 302-i-j. For several reasons, however, 0.5 is not the preferable choice. First, any error in the transformation can cause the feedback loop to overshoot the actual transformation needed. In some cases, an aggressive choice of scaling factor can result in repeated overshoot resulting in a lack of convergence to a proper solution. This is analogous to a proportional-integral control loop. The control error is the differential transformation, which can have substantial uncertainty and nonlinearity because of the way it is estimated using feature points. The integrator is the application of the new differential transformation to the previous transformation. Smaller values of $\gamma$ ensure that the control loop is stable, but at the expense of increasing the time required to reach a steady state.

Using affine transformation 502-i-j discussed above and with respect to FIG. 5, the updated transformation matrix and translation vector are described as:

$$\begin{bmatrix} A_j'^{XX} & A_j'^{XY} \\ A_j'^{YX} & A_j'^{YY} \end{bmatrix} = \begin{bmatrix} s_i\cos\theta & -s_i\sin\theta \\ s_i\sin\theta & s_i\cos\theta \end{bmatrix} \begin{bmatrix} A_j^{XX} & A_j^{XY} \\ A_j^{YX} & A_j^{YY} \end{bmatrix} \quad (6)$$

and $$\begin{bmatrix} x_j'^T \\ y_j'^T \end{bmatrix} = \begin{bmatrix} x_j^T \\ y_j^T \end{bmatrix} + \frac{1}{\sqrt{(x_j^C)^2 + (y_j^C)^2}} \begin{bmatrix} x_j^C & -y_j^C \\ y_j^C & x_j^C \end{bmatrix} \begin{bmatrix} t_{xi} \\ t_{yi} \end{bmatrix}$$

The update steps for sub-image 302-i-j are the same but with the substitution of the index i for j and the index j for i. Since a differential update is normally small, the translation commutes with the rotation and scaling and, therefore, they can be applied at the same time without consideration of the effect of rotation and scaling on the translation vector.

In the present invention, it is assumed that the rotation and translation of the sub-images is nominal, however, to an extent the overlap regions can be moved to compensate for stitching errors due to errors in the nominal rotation and translation of the camera. If, however, the rotations of all overlap regions 304-*i*-1 through 304-*i*-M rotate about the center of sub-image 116-*i* in a common direction, it can be inferred that microcamera 104-*i* itself is rotated. In similar fashion, if the translations of all overlap regions 304-*i*-1 through 304-*i*-M are in a common direction relative to the center of sub-image 116-*i*, it can be inferred that microcamera 104-*i* is translated from its design position. To compensate for the common rotation and/or translation of microcamera 104-*i*, sub-image 116-*i*, itself, can be rotated and/or translated to reduce the amount of distortion required at its edge relative to its center. This avoids giving rise to large distortion at the edges of the sub-image (relative to its undistorted center), which can give rise to more visible distortion in the resultant image.

In some embodiments, the average rotation and translation of all of overlap regions 304-*i*-1 through 304-*i*-M is determined by examining the translations of the overlap regions with respect to the origin of sub-image 116-*i*:

$$\begin{bmatrix} x'^T_{AVE^T} \\ y'^T_{AVE^T} \end{bmatrix} = \frac{1}{M} \sum_{j=1}^{M} \begin{bmatrix} x'^T_j \\ y'^T_j \end{bmatrix} \quad (7)$$

and $$\theta_{AVE} = \frac{1}{M} \sum_{1}^{M} \arctan 2[(y^C_j + y'^T_j)x^C_j - (x^C_j + x'^T_j)y^C_j,$$

$$(x^C_j + x'^T_j)x^C_j + (y^C_j + y'^T_j)y^C_j]$$

where arctan 2 is the four-quadrant arctangent function with range from $-\pi$ to $+\pi$. The average translation of the overlap regions with respect to the microcamera field is given by $(x'_{AVE}{}^T, y'_{AVE}{}^T)$. This translation can be subtracted from the overlap regions and the translation of the camera field updated. Similarly, the average rotation angle of all the overlap regions is given by $\theta_{AVE}$. The microcamera overlap areas may be rotated about the microcamera center by $-\theta_{AVE}$ and the microcamera field rotated by the opposite amount about its axis. This allows for a small amount of correction to the camera geometrical parameters using the overlap fit.

At operation 209, for each of 1=1 through N and j=1 through M, the overlap deformations developed in feedback loop 212 are applied to each of sub-images 116-*i* and 302-*i*-*j*.

At operation 210, image 118 is rendered based on transformed and corrected sub-images 116 (i.e., sub-images 116 after distortion correction and overlap deformations have been applied).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for forming an image of a scene, the method comprising:
acquiring a first plurality of sub-images containing image pixels, wherein each sub-image of the first plurality thereof is based on a different portion of the scene, and wherein the first plurality of sub-images includes a first sub-image based on a first portion of the scene and a second sub-image based on a second portion of the scene, and further wherein the first sub-image and second sub-image overlap in a first overlap region;
defining a first transformation based on a first correspondence of a first plurality of key features in the first overlap region, the first plurality of key features being in each of the first sub-image and second sub-image;
determining a first distortion for improving the first correspondence; and
applying the first distortion to each of the first sub-image and second sub-image to form a distorted first sub-image and a distorted second sub-image, where the first distortion is applied to the first sub-image and the second sub-image in equal and opposite fashion.

2. The method of claim 1, further comprising:
multiplying the first distortion by a first masking function to form a first masked distortion, the masking function having a first magnitude at a first point within the overlap region that is greater than a second magnitude at a second point that is outside of the overlap region and within the first sub-image; and
applying the first distortion to each of the first sub-image and second sub-image as the first masked distortion.

3. The method of claim 1, further comprising scaling the first distortion by a scaling factor that is less than 0.5.

4. The method of claim 1 wherein the first transformation is an affine transformation.

5. The method of claim 1, further comprising:
multiplying the first distortion by a first masking function, the masking function having a first magnitude at a first point within the overlap region that is greater than a second magnitude at a second point that is outside of the overlap region and within the first sub-image; and
scaling the first distortion by a scaling factor that is less than 0.5.

6. The method of claim 1, further comprising:
defining a second transformation based on a second correspondence of a second plurality of key features in a second overlap region, the second plurality of key features being in each of the first sub-image and a third sub-image of the first plurality of sub-images;
determining a second distortion for improving the second correspondence; and
applying the second distortion to each of the first sub-image and third sub-image, where the second distortion is applied to the first sub-image and the third sub-image in equal and opposite fashion.

7. The method of claim 6, further comprising:
multiplying the first distortion by a first masking function to form a first masked distortion, the first masking function having a first magnitude at a first point within the first overlap region that is greater than a second magnitude at a second point that is outside of the first overlap region and within the first sub-image;
applying the first distortion to each of the first sub-image and second sub-image as the first masked distortion;
multiplying the second distortion by a second masking function to form a second masked distortion, the second masking function having a third magnitude at a third point within the second overlap region that is greater than a fourth magnitude at a fourth point that is outside of the second overlap region and within the first sub-image; and
applying the second distortion to each of the first sub-image and third sub-image as the second masked distortion.

8. The method of claim 1 further comprising:
acquiring a second plurality of sub-images containing image pixels, wherein each sub-image of the second plurality thereof is based on a different portion of the scene, and wherein the second plurality of sub-images includes a third sub-image based on the first portion of the scene and a fourth sub-image based on the second portion of the scene, and further wherein the third sub-image and fourth sub-image overlap in at least a portion of the first overlap region;
refining the first transformation based further on a second correspondence of a second plurality of key features in the first overlap region, the second plurality of key features being in each of the third sub-image and fourth sub-image;
determining a second distortion based on the first correspondence and the second correspondence; and
applying the second distortion to each of the third sub-image and fourth sub-image, wherein the second distortion is applied to the third sub-image and the fourth sub-image in equal and opposite fashion.

9. The method of claim 8 further comprising:
multiplying the second distortion by a masking function to form a masked distortion; and
applying the second distortion to each of the third sub-image and fourth sub-image as the masked distortion.

10. The method of claim 1, further comprising:
determining a baseline configuration for an imaging system that includes a plurality of microcameras that includes a first microcamera and a second microcamera, wherein the first microcamera provides the first sub-image and the second microcamera provides the second sub-image;
defining a plurality of distortion models that includes a first distortion model for the first microcamera and a second distortion model for the second microcamera;
applying a first distortion correction to the first sub-image, wherein the first distortion correction is based on the first distortion model; and
applying a second distortion correction to the second sub-image, wherein the second distortion correction is based on the second distortion model.

11. The method of claim 1, wherein the first transformation is defined by operations comprising:
identifying the first plurality of key features;
developing the first correspondence; and
developing the first transformation as an affine transformation.

12. An imaging system comprising:
a plurality of microcameras operative for providing a first plurality of sub-images, the plurality of microcameras being arranged such that (1) each of the first plurality of sub-images corresponds to a different portion of a scene and (2) the first plurality of sub-images includes a first sub-image and a second sub-image that overlap to collectively define a first overlap region; and
a processor that is operative for:
(a) defining a first transformation based on a first correspondence between a first plurality of key features included in the first overlap region, wherein each of the first sub-image and a second sub-image includes the first plurality of key features;
(b) determining a first distortion for improving the first correspondence;
(c) applying the first distortion to each of the first sub-image and second sub-image to form a first distorted sub-image and a second distorted sub-image, wherein the first distortion is applied to the first sub-image and second sub-image in equal and opposite fashion; and
(d) rendering an image of the scene based at least in part on the first distorted sub-image and the second distorted sub-image.

13. The imaging system of claim 12 further comprising an objective lens that is operative for providing an intermediate image of the scene at an image field, wherein each of the plurality of microcameras is operative for providing its respective sub-image by imaging a portion of the intermediate image.

14. The imaging system of claim 12 wherein the processor is further operative for multiplying the first distortion by a first masking function that has a first magnitude at a first point within the first overlap region that is greater than a second magnitude at a second point that is outside of the first overlap region and within the first sub-image.

15. The imaging system of claim 12 wherein the processor is further operative for scaling the first distortion by a scaling factor that is less than 0.5.

16. The imaging system of claim 12 wherein the plurality of microcameras is further operative for providing a second plurality of sub-images that includes a third sub-image and a fourth sub-image that overlaps with the third sub-image, the third sub-image and first sub-image corresponding to a first portion of the scene, and the fourth sub-image and the second sub-image corresponding to a second portion of the scene, and wherein the processor is further operative for refining the first transformation based on a second correspondence between a second plurality of key features included in each of third sub-image and fourth sub-image.

* * * * *